G. C. WORTMAN.
PUSH CAR.
APPLICATION FILED AUG. 28, 1907.
908,635.
Patented Jan. 5, 1909.
3 SHEETS—SHEET 1.
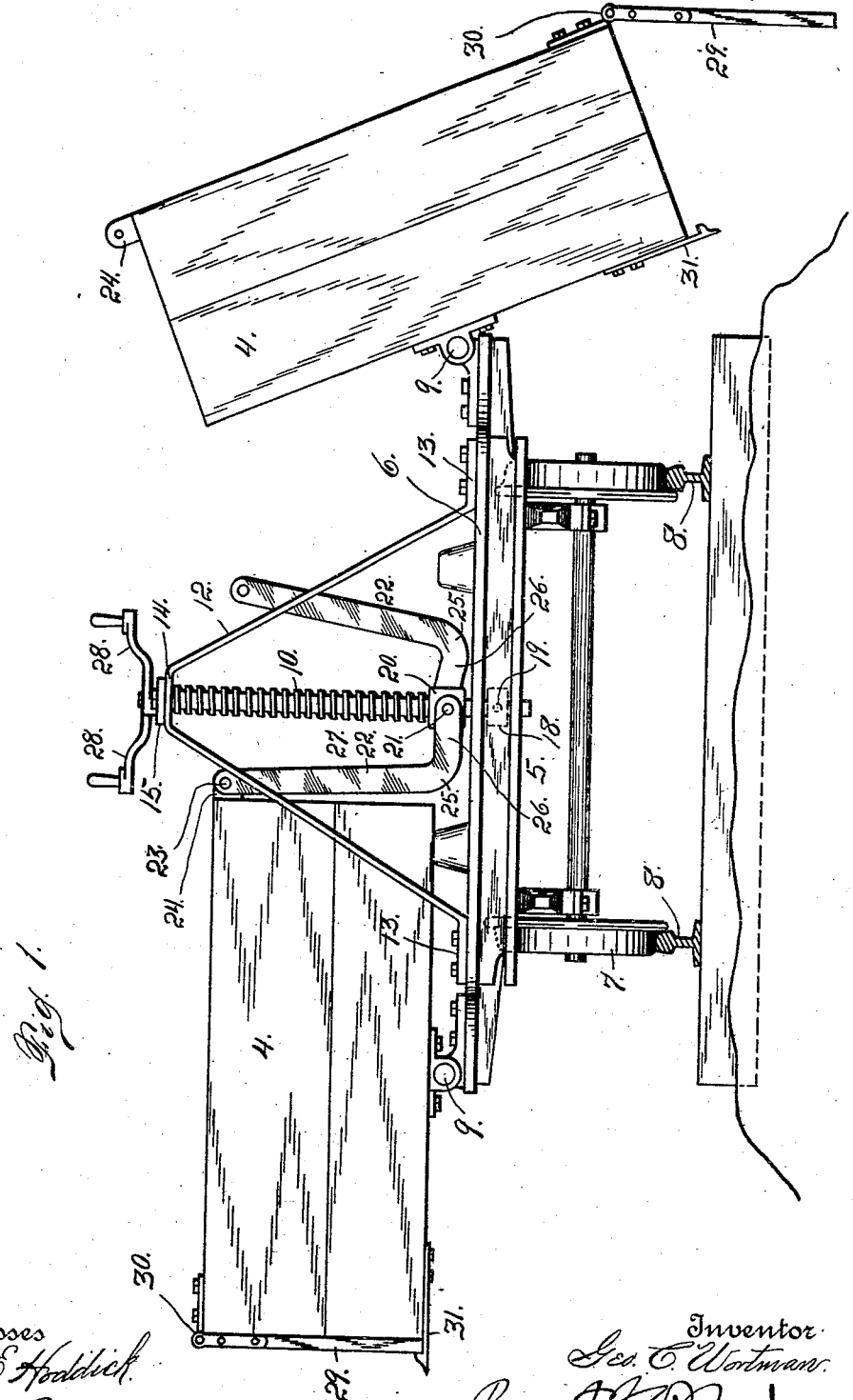
Witnesses
Inventor
Attorney G. C. WORTMAN.
PUSH CAR.
APPLICATION FILED AUG. 26, 1907.
908,635.
Patented Jan. 5, 1909.
3 SHEETS—SHEET 2.
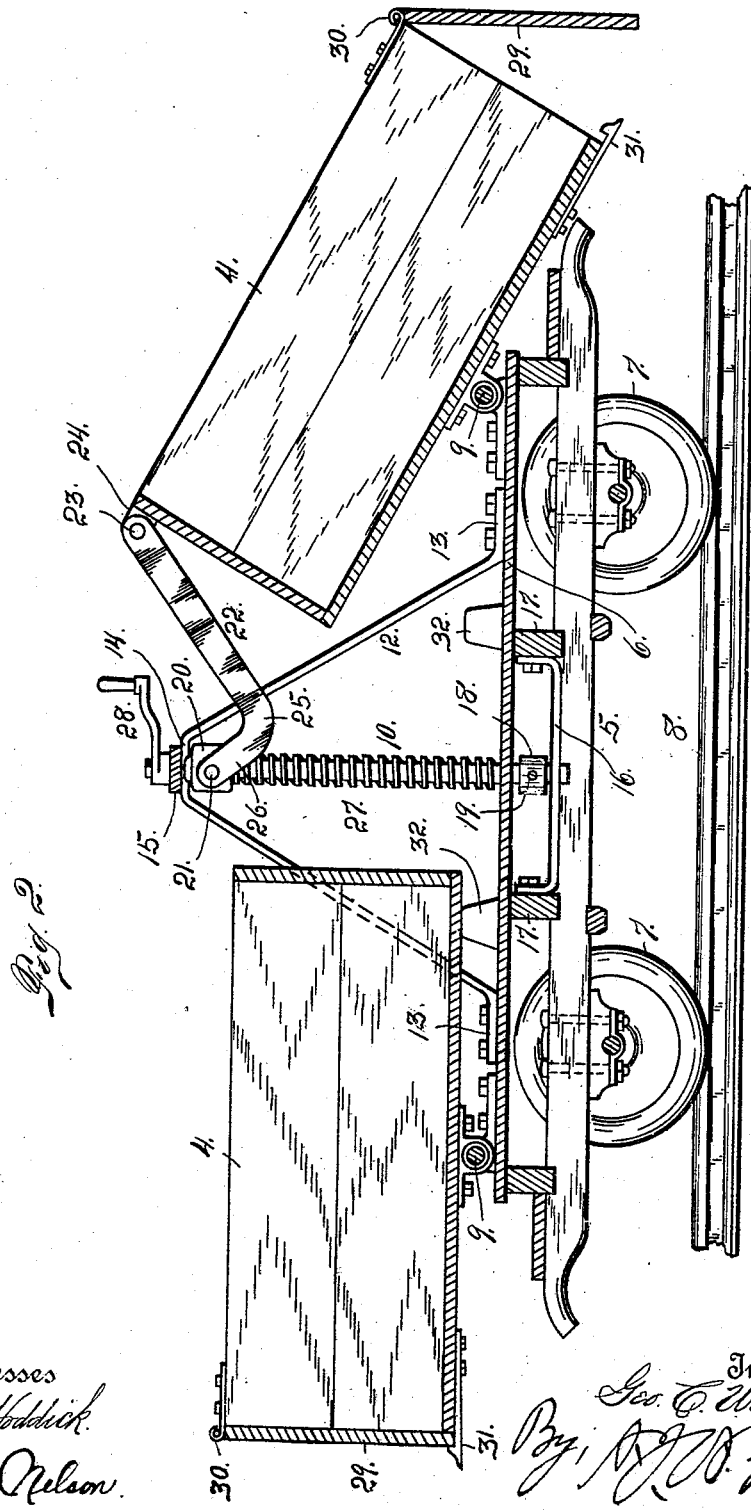

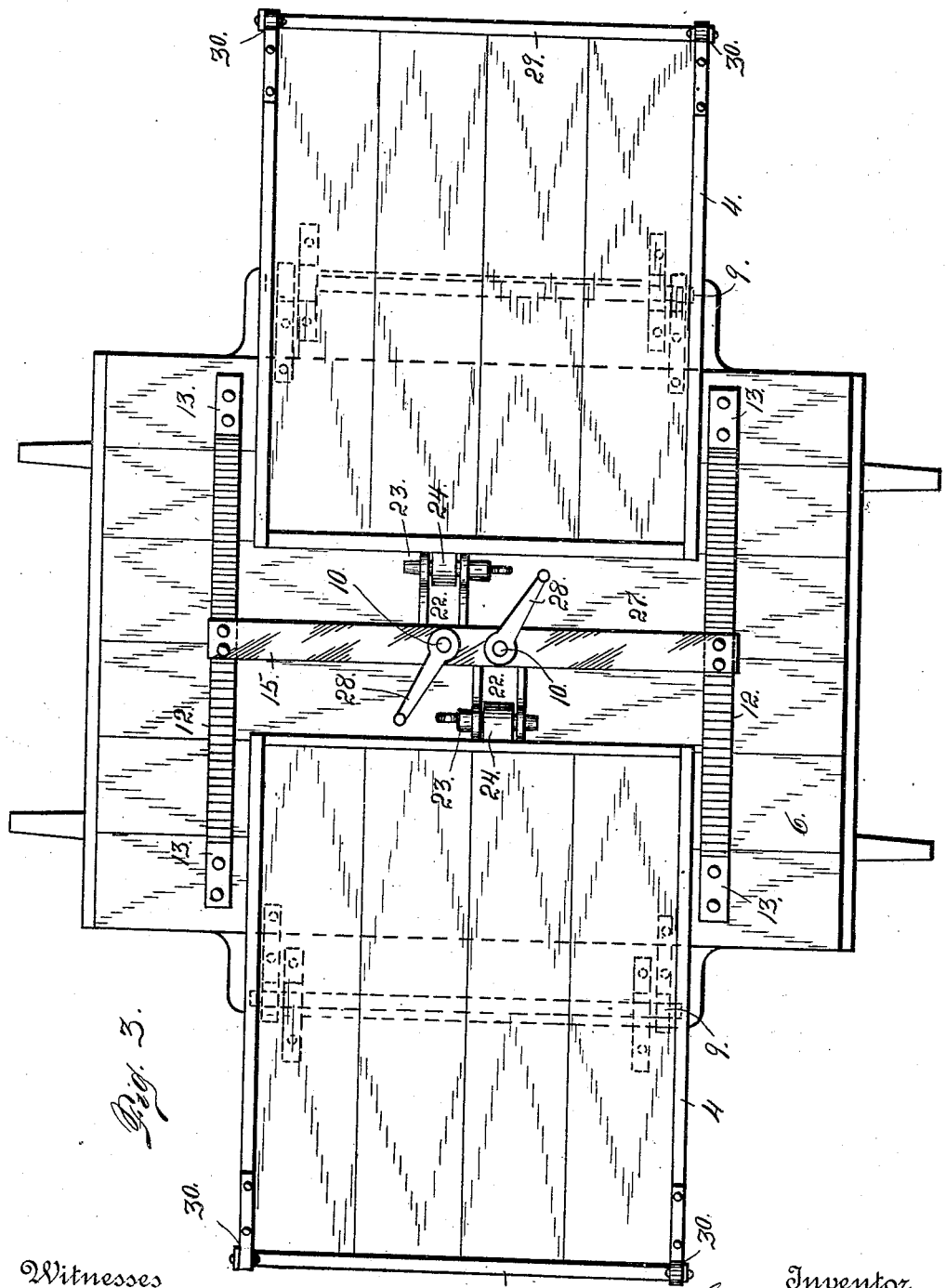

UNITED STATES PATENT OFFICE.

GEORGE C. WORTMAN, OF WORTMAN, COLORADO.

PUSH-CAR.

No. 908,635.     Specification of Letters Patent.     Patented Jan. 5, 1909.

Application filed August 26, 1907. Serial No. 390,146.

*To all whom it may concern:*

Be it known that I, GEORGE C. WORTMAN, a citizen of the United States, residing at Wortman, in the county of Lake and State of Colorado, have invented certain new and useful Improvements in Push-Carts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to improvements in push cars of the class provided with dumping bodies.

The construction herein described is similar to that covered by an application filed by me August 16, 1907, Serial Number 388,757. These two applications will be filed simultaneously.

The chief distinction between my present invention and that covered in the other application, consists in the fact that in my present invention the platform is stationary and the dumping bodies may be originally mounted thereon to dump in either direction, that is to say either longitudinally or transversely of the track upon which the cars run.

Having briefly outlined my improved construction, I will proceed to describe the same in detail reference being made to the accompanying drawing in which is illustrated an embodiment thereof.

In this drawing, Figure 1 is a side elevation of a dump car equipped with my improvements, one of the dumping bodies being released from the link which connects it with the operating screw. Fig. 2 is a sectional view showing one of the dumping bodies in the tilted position. Fig. 3 is a top plan view of my improved dump car showing both dumping bodies in their normal or horizontal position.

The same reference characters indicate the same parts in all the views.

Let the numeral 5 designate the frame work of a push car upon which is mounted a stationary platform 6. The frame 5 is supported upon wheels 7 engaging the rails 8 of the track in the usual manner.

Referring first to Figs. 2 and 3, two dumping bodies 4 are hinged upon the platform as shown at 9 from the hinging axis extending transversely of the length of the platform or the direction of travel of the car. The dumping bodies in this form of construction are arranged to dump upon the track since they discharge their contents at each end of the car.

Mounted in the central part of the car are two upright screw shafts 10. Mounted on opposite sides of the car and extending above and over the central part of the platform 6, are two standards 12 having the general shape of the letter A. The extremities 13 of these standards are bent to engage the platform and secured thereto by suitable fastening devices. The upper extremities of the standards are flattened as shown at 14 and connected by a cross bar 15. The screw shafts 10 are journaled at their upper extremities in the transverse bar 15, while their lower extremities pass through the platform and are journaled in stirrup-shaped bars 16 connected with two transverse sills 17.

Between the platform 6 and a bar 16 is located a collar 18 made fast to the lower extremity of a screw shaft by a set screw 19. This collar anchors the screw shaft securely in place. Between the platform 6 and the top of the apparatus 12, each screw shaft is provided with a coarse thread upon which is mounted a nut 20 which may be caused to travel in either direction upon the screw shaft according to the direction in which the latter is turned. Each nut 20 is provided on opposite sides with trunnions 21 with which are movably connected one extremity of a pair of links 22, the opposite extremities of these links being connected with a pin 23 passing through registering openings formed in the link extremities and a lug 24 fast on the body of the car. The pins 23 are coupling pins and serve to couple the links with the body of the car. When the coupling pin is in place the body of each car is connected with a nut 20 on a coupling shaft 10 by means of a pair of links 22. Each of these links is bent at 25 to form a short inwardly-extending arm 26. By virtue of this arrangement, when the dumping bodies are in the upright or horizontal position, there is a considerable space 27 upon the platform between the inner adjacent extremities of the two dumping bodies. This space forms ample room for the workmen engaged in manipulating the car bodies. The extremity of each screw shaft 10 extending above the cross bar 15, is shaped to receive a crank handle 28 which is readily removable.
As shown in the drawing each car body is provided with a door 29 hinged at the top as shown at 30 and normally locked in the closed position by a spring catch 31. In order to dump the car this door must be released from its catch whereby it is allowed to swing outwardly to the position shown at the right in Fig. 2.

The platform is provided beneath the inner extremity of each car with a short upright support 32 upon which the bottom of the car rests when in its normal or horizontal position.

When it is desired to tilt the car bodies to the dumping position, it is only necessary for the operator to rotate the screw shafts 10 in the proper direction, whereby the nuts 20 are caused to travel upwardly on the screw shafts. This upward travel of the nuts, carries the inner extremities of the links 22 with them, whereby the car bodies are tilted as illustrated at the right of Fig. 2. After the dumping operation is complete, the car bodies may be restored to their normal position by reversing the movement of the screw shafts whereby the nuts 20 are caused to travel downwardly thereon.

In the form of construction shown in Fig. 1, the structure is substantially similar to that shown in the other views, except that the dumping bodies are hinged to the opposite sides of the platform, the axes of their hinge pins extending parallel with the direction of the track or with the direction of the car's travel. By virtue of this construction, the car bodies may be dumped on opposite sides of the track. By virtue of my improved construction, cars may be constructed for purposes of dumping directly upon the track or at the side thereof as may be desired. The stationary platform equipped with my improved construction, constitutes an exceedingly simple and economical form of push car, the dumping bodies beink quickly and easily operated in the manner heretofore explained.

Having thus described my invention, what I claim is:

1. In a push car, the combination with a stationary platform, of a car body tiltably mounted thereon, a vertically disposed screw shaft suitably journaled, a nut mounted on the screw shaft, and a link connection between the nut and the car body above the bottom of the latter, whereby as the shaft is rotated to cause the nut to travel thereon, the car body is actuated, substantially as described.

2. The combination with a stationary platform, of a car body tiltably mounted thereon, a vertically disposed screw shaft suitably journaled on the car, a nut mounted on the threaded portion of the shaft, and a suitable connection between the nut and the car body above the bottom of the latter, whereby as the nut is caused to travel on the shaft, the car body is actuated, substantially as described.

3. The combination with the stationary frame work of a car, of a car body tiltably mounted thereon, a vertically disposed screw shaft journaled in the frame work, and a suitable connection between the screw shaft and the car body above the bottom of the latter, whereby as the shaft is rotated, the car body is actuated for the purpose set forth.

4. The combination with the stationary frame work of a car, of a car body tiltably mounted thereon, a vertically disposed screw shaft journaled in the frame work, and a suitable connection between the screw shaft and the car body above the bottom of the latter, whereby as the shaft is rotated, the car body is actuated for the purpose set forth.

5. The combination with the stationary frame work of a car, of a car body tiltably mounted thereon, upright supports mounted on the frame work, a transverse bar connecting these supports, a screw shaft journaled in the said bar, a nut mounted on the said shaft, and an angle link connecting the said nut with the car body above the bottom of the latter, substantially as described.

6. The combination with the stationary frame work of a car, of a screw shaft journaled therein, a nut mounted on the shaft, a car body tiltably mounted on the platform, and a pair of links connecting the nut with the car body above the bottom of the latter, substantially as described.

7. The combination with the stationary frame work of a car, of two car bodies tiltably mounted thereon, screw shafts journaled in the frame work, a nut mounted on each screw shaft, a link connection between each nut and one of the car bodies above the bottom of the latter, whereby as the shaft is rotated and the nut is caused to travel thereon, the car bodies will be actuated, substantially as described.

8. The combination with the stationary platform of a car, of two car bodies tiltably mounted thereon and arranged end to end, a space being left on the platform between the inner extremities of the two car bodies, screw shafts suitably journaled and occupying a position in the said space, and a suitable connection between the screw shafts and the respective car bodies above the bottom of the latter, whereby as the shafts are turned the car bodies will be actuated, substantially as described.

In testimony whereof I affix my signature in presence of two witnesses.

GEORGE C. WORTMAN.

Witnesses:
  DENA NELSON,
  A. J. O'BRIEN.